United States Patent
Poutievski et al.

(10) Patent No.: US 8,755,389 B1
(45) Date of Patent: Jun. 17, 2014

(54) SEMI-CENTRALIZED MULTIPLE PATH ROUTING

(75) Inventors: Leon Poutievski, Santa Clara, CA (US); Subhasree Mandal, San Jose, CA (US); Subbaiah Venkata, Sunnyvale, CA (US); Amit Gupta, San Jose, CA (US); Joon Ong, Cupertino, CA (US)

(73) Assignee: Google Inc., Mountain View, CA (US)

( * ) Notice: Subject to any disclaimer, the term of this patent is extended or adjusted under 35 U.S.C. 154(b) by 254 days.

(21) Appl. No.: 13/439,748

(22) Filed: Apr. 4, 2012

(51) Int. Cl.
*H04L 12/56* (2006.01)

(52) U.S. Cl.
USPC .................................................. 370/395.31

(58) Field of Classification Search
None
See application file for complete search history.

(56) References Cited

U.S. PATENT DOCUMENTS

| | | | |
|---|---|---|---|
| 2003/0133411 A1* | 7/2003 | Ise et al. | 370/230 |
| 2005/0276230 A1* | 12/2005 | Akahane et al. | 370/252 |
| 2010/0034109 A1* | 2/2010 | Shomura et al. | 370/252 |

\* cited by examiner

*Primary Examiner* — Yong Zhou
(74) *Attorney, Agent, or Firm* — Fish & Richardson P.C.

(57) ABSTRACT

Methods, systems, and apparatus, including computer programs encoded on computer storage media, for semi-centralized routing. One of the methods includes receiving one or more routes and determining that a received route identifies a new set of paths different from each routing path group in a maintained set of routing path groups. A new routing path group is created that corresponds to the new set of paths. The new routing path group is assigned an identifier of the routing path group. The new routing path group is converted to a corresponding new flow path group. A flow path group that was converted from the routing path group is replaced on a network device with the converted new flow path group.

22 Claims, 5 Drawing Sheets

SEMI-CENTRALIZED MULTIPLE PATH ROUTING

BACKGROUND

This specification relates to forwarding network traffic.

The Internet is made up of multiple autonomous systems. An autonomous system can be a network of multiple machines, including routers, clients, and servers that are each controlled by a network operator, e.g., an Internet service provider or a large corporation. In the autonomous system, a router uses a routing protocol to enable communications between machines in the autonomous system and with machines in other networks and/or other autonomous systems. For example, a router can use a selected routing protocol to direct a communication to and from specific machines. Different routing protocols can be used to direct communications within the autonomous system and communications to a network outside the autonomous system. For example, the Border Gateway Protocol (BGP) can be used to route data packets outside of the autonomous system, and the Internal Border Gateway Protocol (IBGP) or Open Shortest Path First (OSPF) protocol can be used to route data packets within the autonomous system.

Available communications protocols include centralized communications protocols and routing protocols. In a centralized communications protocol, each network device operates under the control of a centralized server that has complete information about all other devices in the network (e.g., topological information). In a routing protocol, each device maintains its own information about other devices in (and preferred routing paths within) the network or autonomous system and independently updates such information based on protocol messages received from other devices in the network.

SUMMARY

This specification describes technologies relating to semi-centralized routing.

In general, one innovative aspect of the subject matter described in this specification can be embodied in methods that include the actions of maintaining a set of routing path groups, wherein each routing path group is a distinct set of paths, wherein a path identifies a network address and a device interface identifier, and wherein each routing path group has an associated identifier; maintaining a set of routes of a routing protocol, wherein each route is identified by a destination network address prefix, wherein each route identifies a set of paths, and wherein each route is associated with a routing path group identifier of a routing path group that corresponds to the identified set of paths; receiving one or more updated routes; determining that a received updated route identifies a new set of paths different from each routing path group in the maintained set of routing path groups; creating a new routing path group corresponding to the new set of paths; determining that each received updated route that identifies the new set of paths corresponds to a maintained route that is associated with a particular routing path group identifier; assigning to the new routing path group an identifier of the particular routing path group; converting the new routing path group to a corresponding new flow path group; and replacing on a network device a particular flow path group that was converted from the particular routing path group with the converted new flow path group. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Determining that each received updated route that identifies the new set of paths corresponds to a maintained route comprises maintaining a reference count for each routing path group of routes that use the routing path group; decrementing the reference count for the particular routing path group when an updated route changes from the particular routing path group to the new routing path group; and determining that the reference count for the particular routing path group is zero. The actions further include converting each received route to a flow; and writing each converted flow to a network device. The actions further include maintaining a flow table of converted flows, wherein a key to the flow table is a set of match rules. Each flow is an OpenFlow protocol flow. Maintaining a set of routing path groups comprises maintaining a routing path group table, wherein a key to the routing path group table is a routing path group identifier and the value of the routing path group table is a distinct set of paths. The actions further include maintaining a flow path group table of flow path groups converted from routing path groups, wherein a key to the flow path group table is a flow path group identifier, and wherein a value of the flow path group table is a set of actions. Maintaining a set of routes of a routing protocol comprises maintaining a routing table, wherein a key to the routing table is a destination network address prefix.

In general, another innovative aspect of the subject matter described in this specification can be embodied in methods that include the actions of maintaining a set of routing path groups, wherein each routing path group is a distinct set of paths, wherein a path identifies a network address and a device interface identifier, and wherein each routing path group has an associated identifier; maintaining a set of routes of a routing protocol, wherein each route is identified by a destination address prefix, wherein each route identifies a set of paths, and wherein each route is associated with a routing path group identifier of a routing path group that corresponds to the set of paths; providing flows to a network device that processes network traffic, each flow having been converted from a respective received route, each flow identifying a respective flow path group derived from a corresponding routing path group from the set of maintained routing path groups; determining that communication with the network device has been interrupted; after resuming connection with the network device, receiving from the network device one or more flow path groups; converting each maintained routing path group to a corresponding converted flow path group; determining that one or more particular flow path groups received from the network device each match a respective converted flow path group; and assigning to each maintained routing path group that matches a respective flow path group received from the network device an identifier of the matching flow path group. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions further include after resuming connection with the network device, designating each maintained routing path group as potentially changed; removing the designation for each matching routing path group; determining that a flow path group did not match a converted flow path group using remaining designations after checking each routing path group in the set of routing path groups against the flow path groups received from the network device; and erasing on the network device each flow path group that did not match a converted flow path group. The actions further include after resuming connection with the network device, designating each maintained routing path group as potentially changed including clearing routing path group identifiers of maintained routing path groups; converting only routing path groups with unassigned identifiers to flow path groups; and writing the converted flow path groups to the network device. Designating each maintained routing path group as potentially changed includes erasing each routing path group identifier. The actions further include converting routing path groups that are designated as potentially changed to corresponding flow path groups; and writing the corresponding flow path groups to the network device. The actions further include maintaining a flow path group table of flow path groups converted from routing path groups, wherein a key to the flow path group table is a flow path group identifier, and wherein a value of the flow path group table is a set of actions. The actions further include maintaining a flow table of converted flows, wherein a key to the flow table is a set of match rules. The actions further include after resuming connection with the network device, receiving from the network device a set of flows, each flow identifying a destination and having an identifier of a flow path group; for a particular flow of the received set of flows: determining that a destination network address of the particular flow matches a destination network address of a particular route in the set of maintained routes, and determining that the flow path group identifier of the particular flow corresponds to a routing path group identifier of the particular route; and designating the particular route as unchanged. A flow update process is bypassed for the flows that correspond to routes designated as unchanged. The actions further include converting only routes not designated as unchanged to corresponding flows; and writing flows to the network device. The actions further include converting each received route to a flow; and writing each converted flow to a network device. Each flow is an OpenFlow protocol flow. Maintaining a set of routing path groups comprises maintaining a routing path group table, wherein a key to the routing path group table is a routing path group identifier and the value of the routing path group table is a distinct set of paths. Maintaining a set of routes of a routing protocol comprises maintaining a routing table, wherein a key to the routing table is a destination network address prefix.

Particular embodiments of the subject matter described in this specification can be implemented so as to realize one or more of the following advantages. Avoiding unnecessary writes of flows and flow path groups to a network device reduces network traffic disruption and packet drops when multipath routes change. Avoiding unnecessary writes also makes semi-centralized routing systems more resilient and provides for faster recovery after interruptions between network devices, between network devices and controllers, and between controllers and route control servers.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, a network includes a master controller, a plurality of network devices, and at least one route control server. The master controller and network devices are configured to implement a centralized communications protocol, e.g., OpenFlow. The route control server analyzes network protocol packets and calculates routing information using a distributed routing protocol, e.g., Border Gateway Protocol (BGP) or Open Shortest Path First (OSPF). The master controller converts the distributed routing protocol information into corresponding centralized communications protocol information for use by the network devices. When updating the centralized communications protocol information on the network devices, the master controller can take various measures to reduce disruptions in network traffic, e.g. packet drops, due to the update.

Figure 1A:
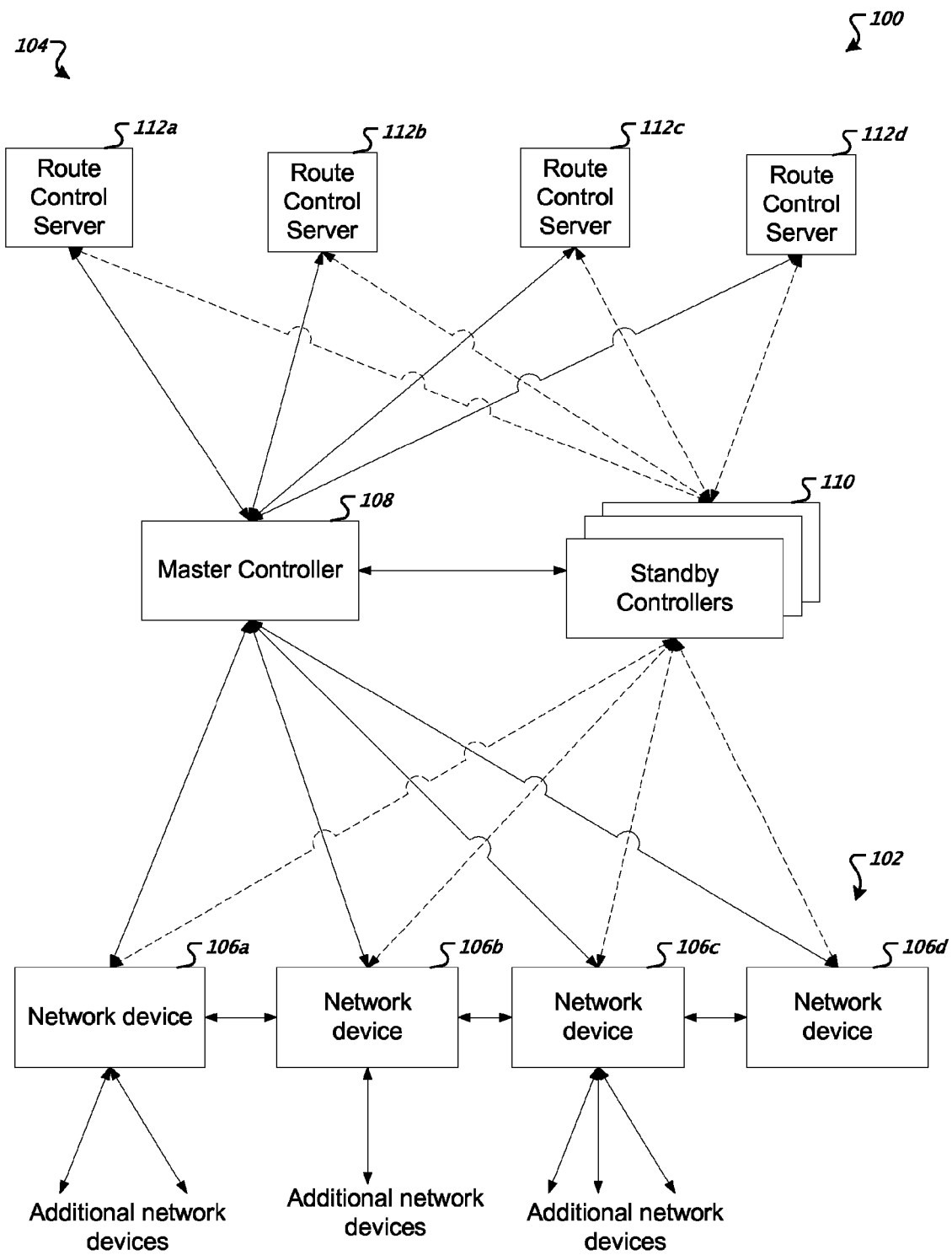
FIG. 1A is a block diagram of an example network that performs semi-centralized routing.

FIG. 1A is a block diagram of an example network 100 that performs semi-centralized routing. The example network 100 includes a data plane 102 and a control plane 104. The data plane 102 includes a plurality of network devices 106a-106d. The network devices 106a-106d can be routers or any other appropriate network devices, e.g., network switches, that are configured to implement a centralized communications protocol. For example, the network devices 106a-106d can implement an OpenFlow communications protocol. Network communications are exchanged between the network devices 106a-106d and the other connected network devices in the data plane 102, which are not shown in FIG. 1A. Although not shown in FIG. 1A, each of network devices 106a-106d can be interconnected. The network devices 106a-106d can also be connected to other network devices in the network 100 and/or other network devices that are outside the network 100

In general, an OpenFlow protocol is a protocol for programming a network device, e.g., a router or a switch, to receive and forward network packets using flows. A flow includes one or more match rules and a corresponding set of actions. Each flow can be stored on the network device in a flow table. When a network packet is received at the network device, the packet contents of the packet, e.g. a packet header, are compared to match rules of flows stored in the flow table. If a match is found, the corresponding set of actions is performed on the packet. For example, a match rule can specify all or a portion of a destination IP address to compare to a destination IP address of a received network packet. Corresponding actions can include, for example, (1) to rewrite the source and destination MAC address in the packet and (2) to forward the packet to a particular destination interface on another network device.

Flows can be defined to correspond to a variety of network transmission protocols. For example, a flow can be a Transport Control Protocol (TCP) flow or an Internet Protocol (IP) flow. The network devices 106a-106d can, for example, be programmed with flows that correspond to a distributed routing protocol, e.g., Border Gateway Protocol (BGP) or Open Shortest Path First (OSPF). The network devices 106a-106d can thus receive network packets from other routers implementing a distributed routing protocol, as well as forward network packets to other routers implementing a distributed routing protocol.

The flow tables on network devices 106a-106d can be programmed by one or more controllers. For example, the control plane 104 includes a master controller 108 and at least one standby controller 110. The master controller 108 can be any type of centralized routing controller that can communicate with and/or control the network devices 106a-106d. For example, in some implementations, the master controller 108 is a type of OpenFlow controller that is configured to perform semi-centralized routing and communicate with the network devices 106a-106d. The master controller 108 can be a server, other type of computer or a computer system (e.g., a network of computers) programmed to perform the operations of the controller.

The master controller 108 can program flow tables on the network devices 106a-106d by converting distributed routing protocol messages, i.e. routes, into corresponding flows. The master controller 108 can receive distributing routing protocol messages from route control servers 112a-112d, which are configured to generate distributed routing protocol messages, e.g. routes. The master controller 108 can then update flow tables on network devices 106a-106d by converting the received routes into corresponding flows.

Figure 1B:
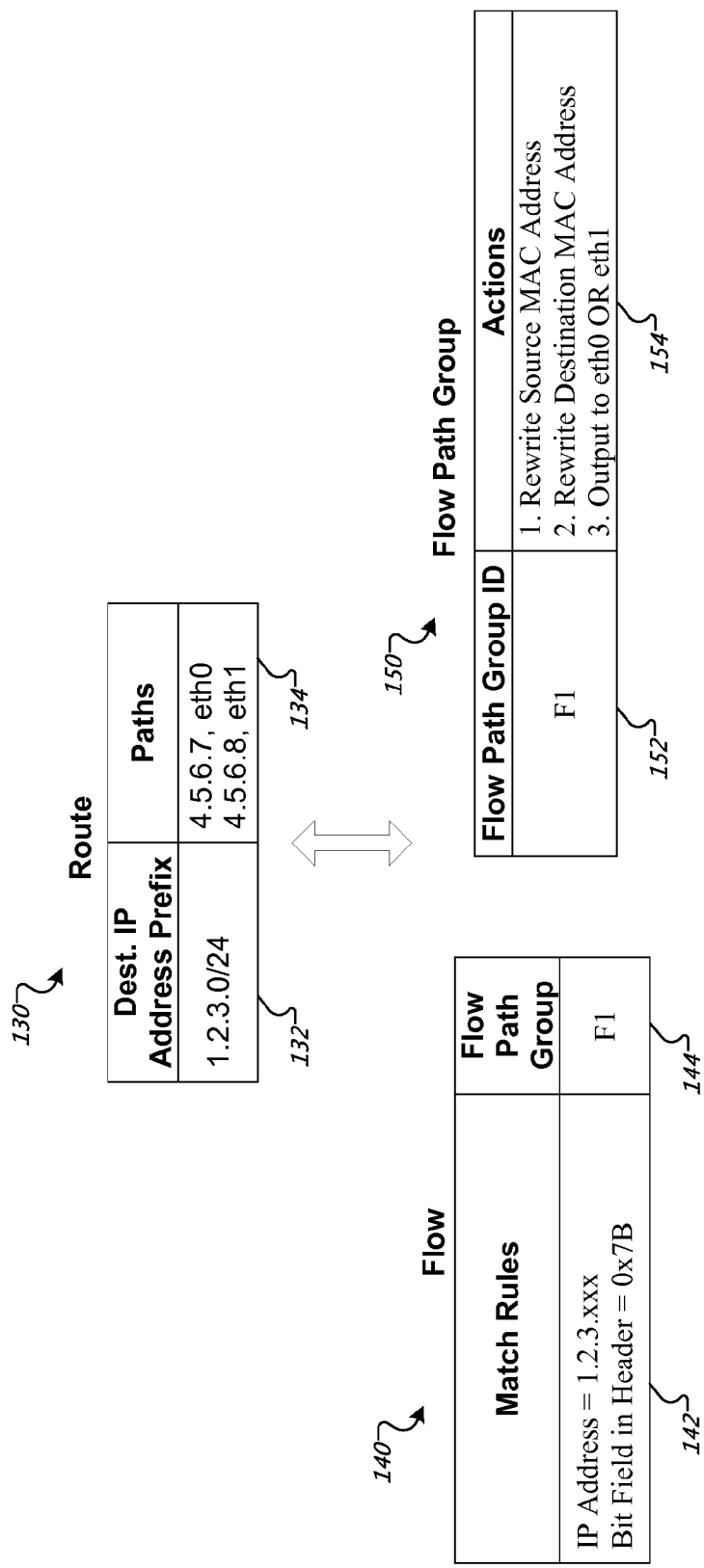
FIG. 1B illustrates an example conversion from a route to a flow.

FIG. 1B is a diagram of an example conversion of a route into a flow. The conversion of a route into a flow as illustrated in FIG. 1B can be performed, for example, by the master controller 108 as shown in FIG. 1A.

A route 130 as specified by a distributed routing protocol can include a destination IP address prefix 132 and a set of one or more paths or "nexthops" 134, in addition to many other types of data. The prefix can be specified by a mask, e.g., "24", indicating that only the most significant 24 bits are significant. Each path includes an IP address, e.g. 4.5.6.7, and an outgoing interface identifier, e.g. "eth0," for Ethernet port 0. The route 130 can be converted into a corresponding flow 140. The flow 140 includes one or more match rules 142. The match rules 142 can include a pattern for the IP Address, e.g. 1.2.3.xxx, where "x" is a placeholder that can assume any appropriate value, in addition to many other types of data. For example, the match rule 142 can also specify that a particular bit field in a network packet header must be a particular value, e.g. 0x7B.

The flow 140 includes a flow path group identifier 144 to a flow path group 150, which specifies a set of actions to be taken upon encountering a network packet that matches match rules 142. The flow path group 150 includes an identifier 152 as a key and a corresponding set of actions 154 as a value. In some implementations, the actions can be stored with the flow 140, rather than being stored in a flow path group 150. However, maintaining the flow path groups 150 in a separate table allows the flow path group definitions to be reused for other flows as well. The controller can, but need not, ensure that all flow path groups with a same set of actions have only a single entry in a flow path group table.

The actions 154 to be taken by a network device can be analogous to those actions taken when the network device forwards traffic according to a distributed routing protocol. For example, the set of actions 154 can include actions to rewrite the source media access control (MAC) address of a packet, rewrite the destination MAC address of a packet, and output the packet to one of a set of interfaces, e.g. eth0 or eth1.

Referring back to FIG. 1A, the master controller 108 can receive distributed routing protocol messages from route control servers 112a-112d, convert the distributed routing protocol messages into corresponding flows and flow path groups, and program network devices 106a-106d accordingly.

The route control servers 112a-112d can be implemented on machines separate from the master controller 108. In some implementations, each route control server 112 can be implemented on an independent machine or computer. In some implementations, multiple route control servers 112 can be implemented on virtual machines operating on a single computer or machine or on a computer system that may include multiple computers.

The master controller 108 can send messages to the network devices 106a-106d and route control servers 112a-112d. For example, the master controller 108 can send messages to the network devices 106a-106d informing the network devices 106a-106d that the master controller 108 is operational and that the network devices 112a-112d should communicate with the master controller 108, i.e., a keep-alive message. The network devices 106a-106d can acknowledge or otherwise respond to the keep-alive message and the master controller 108 can determine which network devices 106a-106d are operational from the acknowledgement messages. For example, if a network device 106 acknowledges or otherwise responds to the keep-alive message, the master controller 108 understands that the network device 106 is active. If the network device 106 does not acknowledge or respond to the keep-alive message, the master controller 106 can interpret the lack of response to indicate that the network device 106 is not operational or has failed. Similarly, the master controller 108 can also send keep-alive messages to the route control servers 112a-112d to inform the route control servers 112a-112d that the master controller 108 is operational and that the route control servers 112a-112d should communicate with the master controller 108. Each of the route control servers 112a-112d can acknowledge or otherwise respond to the messages and inform the master controller 108 that it is operational.

The master controller 108 can periodically transmit keep-alive messages to the network devices 106a-106d and the route control servers 112a-112d. For example, the master controller 108 can transmit keep-alive messages every 60 seconds or some other predetermined frequency. In some implementations, the master controller 108 broadcasts the message to all of the network devices 106a-106d and route control servers 112a-112d at the same time. In some implementations, the master controller 108 can transmit the message to a subset of the network devices 106a-106d and/or a subset of the route control servers 112a-112d.

The master controller 108 can configure the control plane. For example, the master controller 108 can send a configuration message to the route control servers 112a-112d. In response, the master controller 108 can receive messages from the route control servers 112a-112d that inform the master controller 108 that a particular route control server 112 (e.g., route control server 112) is associated with a particular network device 106 (e.g., network device 106a) or a particular group of network devices (e.g., network devices 106a and 106c) and is to perform route calculations for the associated network device(s) 106. The master controller 108 can collect this information and create a table or other data structure that represents the relationships between the network devices 106a-106d and the route control servers 112a-112d (i.e., a route control table). For example, for each network device 106a-106d, the route control table can represent which route control server 112a-112d is assigned to perform route calculations for the network device 106a. In some implementations, there is a one-to-one correspondence between route control servers 112 and network devices 106 such that each route control server 112 performs route calculations for one network device 106. For example, FIG. 1A illustrates a one-to-one correspondence between network devices 106a-106d and route control servers 112a-112d. In some implementations, a route control server 112 performs route calculations for two or more network devices 106. In some implementations, the master controller 108 can be programmed with the route control table and does not generate the route control table from messages received from the route control servers 112a-112d.

In some implementations, the master controller 108 transmits the configuration message when the master controller 108 becomes active, e.g., when a standby controller 110 is assigned to become the master controller, or during network initialization. In addition, in some implementations the master controller 108 can transmit these messages in response to a change in topology. For example, if a network device 106a does not acknowledge a keep-alive message, the master controller 108 can determine that the network device 106a is no longer active and transmits keep-alive messages to the other network devices 112b-112d to update its route control table. The master controller 108 can also determine that a network device 106 has failed using other signals.

In some implementations, if the master controller 108 determines that a network device 106 or route control server 112 has failed or is not operational, the master controller 108 can reconfigure the route control table to account for the failure. For example, if the master controller 108 determines that a route control server 112 is not operational, the master controller 108 can disable the network device(s) corresponding to the route control server 112 or can update the route control table to indicate that the network device(s) corresponding to the route control server 112 should also be not operational. In some implementations, the master controller 108 can enable another route control server to replace the failed route control server and update the route control table to reflect this new route control server.

The master controller 108 can collect topology information from the network devices 106a-106d and/or the route control servers 112a-112d. For example, the master controller 108 can collect topology information from the calculated route information provided by the route control servers 112a-112d. In some implementations, the master controller 108 analyzes the calculated route information received from each of the route control servers 112a-112d and determines the existing network connections and latencies associated with each of the connections. As another example, the master controller 108 can determine topology information from the network devices' 106a-106d acknowledgment of a keep-alive message or a lack of acknowledgement. The master controller 108 can store the topology information and provide it to the route control servers 112a-112d, which can use the topology information to calculate routing information.

As indicated above, when a network device 106a-106d receives a distributed routing protocol packet, the network devices 106a-106d can provide the distributed protocol packet to the master controller 108. In response, the master controller 108 can determine which route control server 112a-112d should process the distributed protocol packet. For example, the master controller 108 can access the route control table to determine which route controller server 112a-112d is associated with the network device 106a-106d that provided the network control packet. The master controller 108 then forwards the distributed routing protocol packet to the corresponding route control server 112a-112d, which performs route calculations using the distributed routing protocol and provides the route calculations to the master controller 108. The route control server 112 is explained in greater detail below.

The control plane 104 can include one or more standby controllers 110. The standby controllers 110 are similar to the master controller 108 but do not receive communications from the route control servers 112a-112d or the network devices 106a-106d until the master controller 108 fails or otherwise becomes nonoperational. For example, the master controller 108 can suffer a hardware or software failure and become nonoperational. As a result of the failure, a standby controller 110 is notified of the failure and assumes the responsibilities of the master controller. In some implementations, the route control servers 112a-112d can detect the master controller's failure because they do not receive a keep-alive message within a predetermined time period. As a result, the route control server 112a-112d can send a message to the standby controller 110 that indicates the master controller 108 has failed and the standby controller 110 is now assigned the role of master controller. Various methods can be used to choose a standby controller 110. For example, the route control servers 112a-112d can be programmed with a predetermined sequence of standby controllers 110 and the route control servers can select standby controllers 110 in sequential order.

The standby controller 110 configures the control plane 104 by transmitting configuration messages to the route control servers 112a-112d. The new master controller 110 can receive the configuration messages from the route control servers 112a-112d and reconstruct a route control table. In addition, the standby controller 110 can transmit keep-alive messages to the network devices 106a-106d and the route control servers 112a-112d. As described above, the keep-alive messages indicate that the route control servers 112a-112d and network devices 106a-106d should communicate with the standby controller 110, which is acting as the master controller.

In some implementations, the standby controller 110 receives communications from the route control servers 112a-112d and the network devices 106a-106d while the master controller 108 is active. The standby controller 110 mimics some of the operations of the master controller 108, e.g., creating a route control table and maintaining topology information, such that when the master controller 108 fails, the standby controller 110 can assume the role of the master controller without building a new route control table or otherwise configuring the control plane. In these implementations, the route control servers 112a-112d and network devices 106a-106d communicate with both the master controller 108 and the standby controllers 110.

In some implementations, the master controller 108 transmits the topology information and the route control table to the standby controller 110 as the topology information and route control table are generated or updated. In some implementations, the master controller 108 periodically provides the topology information and route control table to the standby controller 110. In such implementations, the standby controller 110 can use the received topology information and route control table when it is assigned the role of the master controller.

The route control servers 112a-112d receive distributed routing protocol packets from the master controller 108 and perform route calculations for the network devices 106a-106d. For example, the route control server 112a can receive the distributed routing protocol packet (e.g., BGP or OSPF packets) and calculate the routing information based on the routing protocols. In some implementations, the route control servers 112a-112d can process the calculated routing information to be in a format that can be used by network device 106 to forward data packets. For example, the routing route control serve 112a can process BGP-based routing information into an OpenFlow flow or forwarding table that can be used by the network device 106 to route data packets.

In some implementations, the route control servers 112a-112d can be programmed to perform route calculations based on multiple distributed routing protocols. In these implementations, the route calculations are based on the appropriate distributed routing protocol. For example, the route control server 112 can analyze the distributed routing protocol packet to determine the routing protocol associated with the packet and use the appropriate routing protocol to calculate the route information. Various distributed routing protocols can be used. For example, the route control server 112a-112d can be configured to perform BGP or OSPF route calculations. In some implementations, the route control servers 112a-112d process the protocol packets to identify changes (e.g., topological changes or network traffic-based changes) in the network. Based on these changes, the route control servers 112a-112d perform route calculations to identify new routes. The master controller 108 can convert the new routes into corresponding flows and update flow tables on the network devices 106a-106d accordingly. For example, in some implementations, the route control servers 112a-112d can process the BGP or OSPF protocol packets (i.e., that contain information about the topology of the network and/or network status information) to generate routing information that can be used to update flow tables on the network devices 106a-106d.

In addition, the route control servers 112a-112d can use the route calculations to generate a distributed routing protocol packet based on the route calculations. The distributed routing protocol packet can be provided to the network devices 106a-106d, through the master controller 108. The network devices 106a-106d can then transmit the distributed routing protocol packet to neighboring routers as if it were a router performing a distributed routing protocol.

The route control servers 112a-112d can generate a large volume of routes. In addition, communication between the master controller 108 and the network devices 106a-106d can be interrupted, which can necessitate an update of flows on the network devices 106a-106d by either the master controller 108 (upon resuming communication) or one of the standby controllers 110. However, erasing and rewriting all flows and flow path groups on network devices 106a-106d when resuming communication with a controller can be disruptive to network traffic. Packets for which no match rule is found in the flow table will be dropped by network devices 106a-106d until an appropriate flow is programmed by the controller. Accordingly, the master controller 108 (or a standby controller 110 upon commencing control) can take various measures to reduce the packet drops when updating flows and flow path groups on network devices 106a-106d, as described in more detail below with respect to FIGS. 3 and 4.

Figure 2:
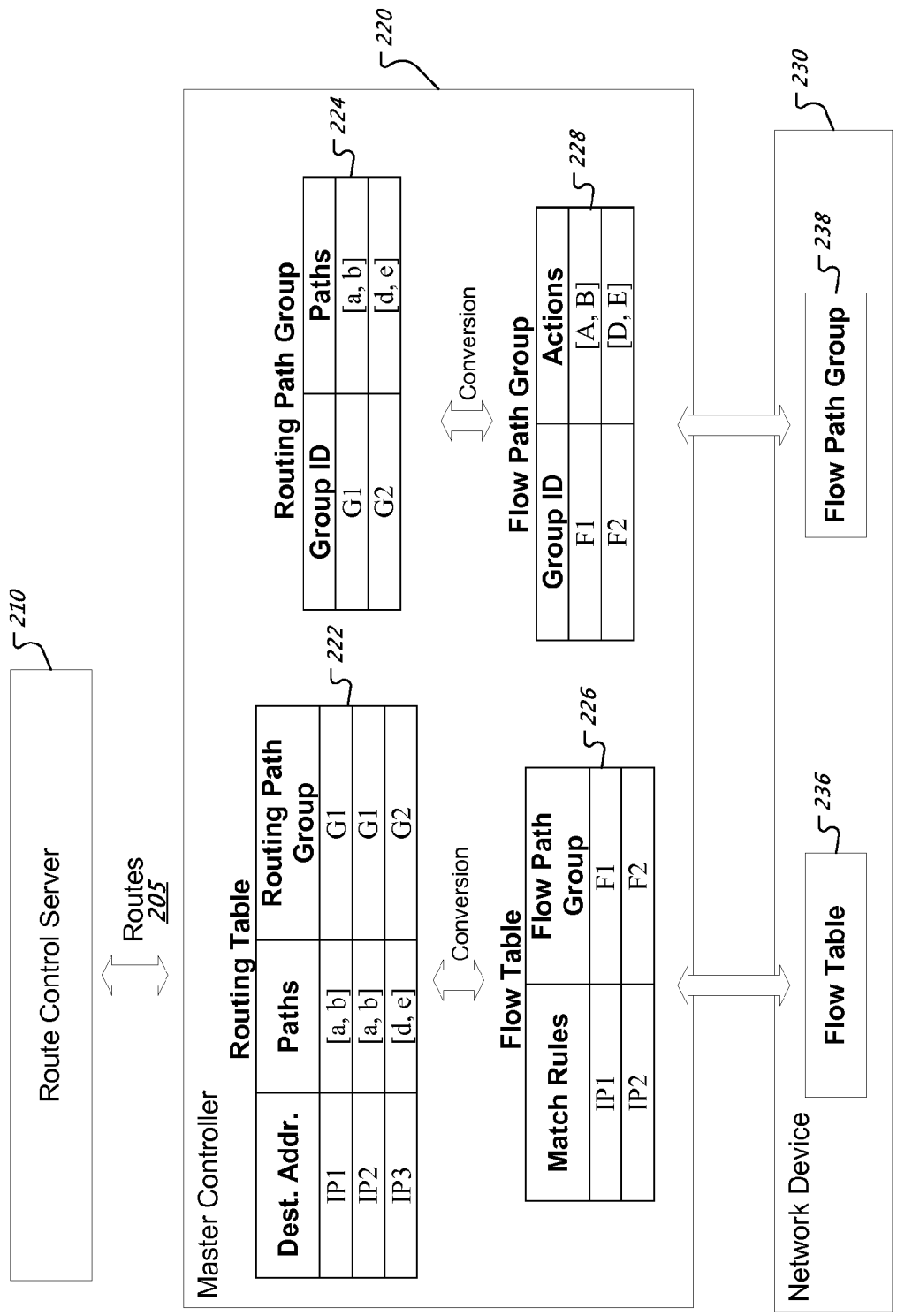
FIG. 2 is illustrates tables maintained by an example controller.

FIG. 2 is a block diagram of tables maintained by an example controller 220. For example, the tables can be maintained by master controller 108 as shown in FIG. 1. In general, the controller 220 receives routes 205 from a route control server 210 and maintains a routing table 222 of received routes. Received routes are converted into flows and stored in flow table 226. Flows in the flow table 226 are written to a corresponding flow table 236 on example network device 230. Each received route 205 has a set of one or more paths. The controller 220 maintains each distinct set of paths in a routing path group table 224. The controller also maintains a corresponding flow path group table 228, which is written to a corresponding flow path group table 238 on the network device 230. Each entry in routing table 222 corresponds to a route. The key for the routing table is a destination IP address prefix, and the values are a set of paths and a routing path group identifier. Each path, e.g. path "a", is defined by an IP address and an outgoing interface identifier, e.g. "4.5.6.7, eth0".

The controller 220 converts routes in the routing table 222 to corresponding flows and maintains a flow table 226 of converted flows. The key for the flow table is a set of match rules, e.g. a destination IP address prefix, and the value is at least a flow path group identifier, in addition to other possible types of information.

The routing path group table 224 includes an entry for each distinct set of paths from received routes 205. The key for the routing path group table 224 is a routing path group identifier, and the value is a set of paths, e.g. [a,b].

The flow path group table 228 includes an entry for each flow path group. The key for the flow path group table 228 is a flow path group identifier, and the value is a set of actions to be taken for a network packet.

The controller 220 can read from and write to the network device 230 to receive and update flows in the flow table 236 and flow path groups in flow path group table 238. In addition, the controller 220 can receive network packets received by the network device 230 and provide the received network packets to the route control server 210 for computation of routes 205.

Figure 3:
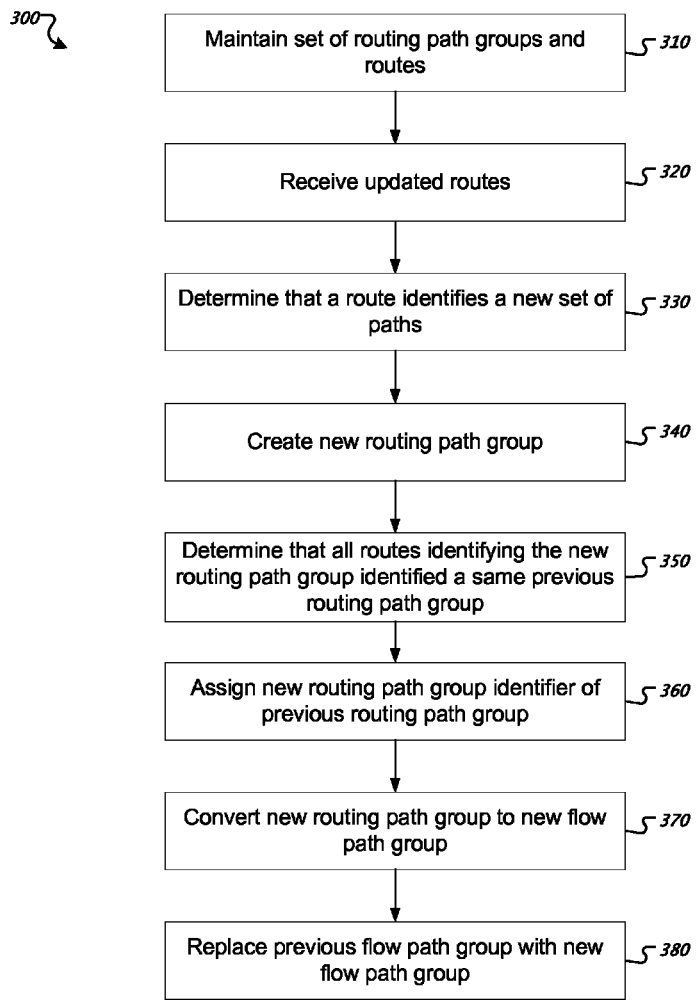
FIG. 3 is a flow chart of an example process for reducing network traffic disruptions.

FIG. 3 is a flow chart of an example process 300 for reducing network traffic disruptions. When new routes are received from the route control server, in certain circumstances disruptions in network traffic can be reduced by updating a single flow path group on a network device rather than creating a new group and rewriting all flows that used the old flow path group. The process 300 can be performed by a controller, for example, the controller 108 as shown in FIG. 1A.

The controller maintains a set of routing path groups and a set of routes (310). As described above, the controller can receive computed routes from a route control server. Each distinct set of paths in the received routes can be maintained as an entry in a routing path group table. Each route identified by a destination address prefix can be maintained in a routing table.

The controller receives updated routes (320). The updated routes can either be received during the normal operation of receiving computed routes from the route control servers, or after resuming communication with the route control servers after an interruption in communication.

The controller determines that an updated route identifies a new set of paths (330). The controller can for example determine that at least one received route identifies a set of paths that is different from each set of paths maintained in the routing path group table. In response, the controller can create a new routing path group entry in the routing path group table to store the new set of paths (340) For example, routing path group table 224 maintains routing path groups [a, b] and [d, e]. If a received route 205 identifies a set of paths, e.g. [a, c], different from [a, b] and [d, e], the controller can create a new [a, c] entry in the routing path group table.

The controller determines that all routes identifying the new routing path group identified a same previous routing path group in the routing table (350). For example, the controller can determine that routes with destination address IP1 and IP2 both identify a new routing path group, e.g. [a, c] instead of [a, b]. In some implementations, the controller can maintain for each routing path group a reference count of routes that identify the routing path group. When a route changes from one routing path group to another, the reference count can be decremented or incremented accordingly. For example, if a received route with destination address IP1 changes from routing path group [a, b] to [a, c], the controller can decrement a count for routing path group [a, b] to reflect that one less route identifies that routing path group. The controller can identify that all routes identifying the new routing path group previously identified a same routing path group by checking the reference count for the previous routing path group. For example, if the reference count for routing path group [a, b] is zero, the controller can determine that all routes that previously identified the particular routing path group, i.e. [a, b], have switched and now identify the new routing path group instead, i.e. [a, c]. In some implementations, the controller determines identification of a routing path group according to the set of corresponding paths of the routes, rather than by routing path group identifiers.

Based on the determination at 350, the controller assigns the new routing path group an identifier of the previous routing path group in the routing path group table (360). For example, if the previous routing path group had an identifier "G1" in the routing path group table, the controller can assign the identifier "G1" to the newly created routing path group. By switching the identifier from the previous routing path group to the new routing path group, the controller can update a single flow path group on the network device without rewriting all flows on the network device that identified the flow path group.

The controller converts the new routing path group to a new flow path group (370). The conversion process can be carried out as described above, with the set of paths of a routing path group being converted into a set of actions of a flow path group.

The controller replaces the previous flow path group on the network device with the new flow path group (380). By switching the identifier of the new routing path group to that of the previous routing path group, the controller can alter the definition of a single flow path group on the network devices rather than rewriting all flows on the network devices.

Figure 4:
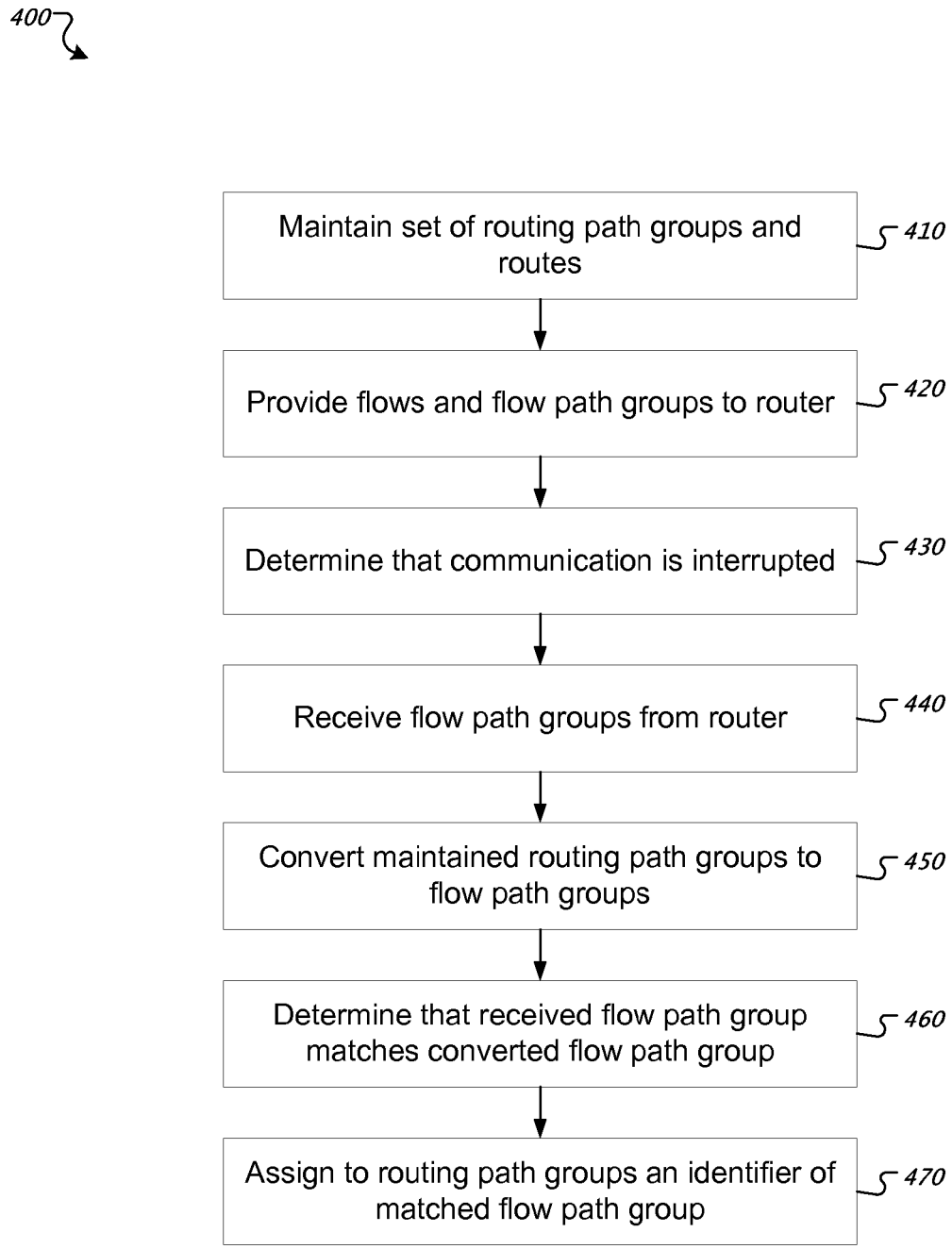
FIG. 4 is a flow chart of an example process for reusing flow path groups.

FIG. 4 is a flow chart of an example process 400 for reusing flow path groups. The example process 400 can be used, for example, after communication with one or more network devices has been interrupted. After resuming communication, the controller can reduce disruptions in network traffic by salvaging flow path groups and flows already on the network devices. The process 400 can be performed by a controller, for example, the controller 108 as shown in FIG. 1A.

The controller maintains a set of routing path groups and a set of routes, as described above (410). The controller provides flows and flow path groups to a network device (420), e.g., a router or a switch. The flows provided to the network device can be converted from received routes of a distributed routing protocol, as described above. The flow path groups provided to the network device can be converted from determined routing path groups, as described above.

The controller determines that communication with a network device has been interrupted (430). For example, the controller can determine that communication with a particular network device has ceased for a threshold period of time or longer.

After resuming communication with the network device, the controller receives one or more flow path groups from the network device (440). After receiving flow path groups from the network device, the controller can try to salvage as many flow path groups as possible to prevent unnecessary overwrites of information on the network device.

The controller converts each maintained routing path group to a corresponding flow path group (450), as described above. The controller determines that one or more of each of the received flow path groups matches a converted routing path group (460). The controller can convert the maintained routing path groups for the purpose of comparison with the received flow path groups. In some implementations, the controller can instead convert the received flow path groups into corresponding routing path groups for the purpose of comparison.

In some implementations, the controller erases on the network device flow path groups that did not match a converted routing path group. Flow path groups on the network device for which no corresponding maintained routing path group was found may be inaccurate, out of date, or otherwise unhelpful. Accordingly, the controller can erase these unmatched flow path groups on the network device.

The controller assigns to each matching routing path group an identifier of corresponding flow path group (480). To preserve as many flow path groups on the network device as possible, the maintained routing path group table can be modified by assigning to matched routing path groups the identifiers of corresponding matched flow path groups on the network device. Reassigning routing path group identifiers can salvage flow path groups already on the network device and prevent unnecessary rewrites of flow path group information on the network device.

In some implementations, the controller can designate each maintained routing path group as potentially changed. The controller can flag all routing path groups as potentially changed in various ways, including by clearing a routing path group identifier of all maintained routing path groups. After determining which received flow path groups match the maintained routing path groups and assigning identifiers accordingly, routing path groups without assigned identifiers will correspond to flow path groups that are not present on the network device. Accordingly, the controller can avoid unnecessary rewrites by converting only routing path groups with unassigned identifiers to flow path groups and by writing only the converted flow path groups to the network device.

In some implementations, the controller can also attempt to salvage flows on the network device after an interruption in communication. After salvaging flow path groups on the network device, the controller can receive flows from the network device. If a received flow has a destination network address that matches a destination network address of a maintained route, and if the received flow path group identifier of the particular flow corresponds to the routing path group identifier of the matched route, the controller can attempt to salvage the flow on the network device without a rewrite. To do so, the controller can designate a route corresponding to a matched flow as unchanged. The controller can then convert only routes without an unchanged designation to flows, and write only these converted flows to the network device.

Accordingly, by salvaging flow path groups and flows on the network device after an interruption in communication, the controller reduces the possibility of packet drops when reprogramming the network device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   maintaining a set of routing path groups, wherein each routing path group is a distinct set of paths, wherein a path identifies a network address and a device interface identifier, and wherein each routing path group has an associated identifier;
   maintaining a set of routes of a routing protocol, wherein each route is identified by a destination network address prefix, wherein each route identifies a set of paths, and wherein each route is associated with a routing path group identifier of a routing path group that corresponds to the identified set of paths;
   receiving one or more updated routes;
   determining that a received updated route identifies a new set of paths different from each routing path group in the maintained set of routing path groups;
   creating a new routing path group corresponding to the new set of paths;
   determining that each received updated route that identifies the new set of paths corresponds to a maintained route that is associated with a particular routing path group identifier;
   assigning to the new routing path group an identifier of the particular routing path group;
   converting the new routing path group to a corresponding new flow path group; and
   replacing on a network device a particular flow path group that was converted from the particular routing path group with the converted new flow path group.

2. The method of claim 1, wherein determining that each received updated route that identifies the new set of paths corresponds to a maintained route comprises:
   maintaining a reference count for each routing path group of routes that use the routing path group;
   decrementing the reference count for the particular routing path group when an updated route changes from the particular routing path group to the new routing path group; and
   determining that the reference count for the particular routing path group is zero.

3. The method of claim 1, further comprising:
   converting each received route to a flow; and
   writing each converted flow to a network device.

4. The method of claim 3, further comprising:
   maintaining a flow table of converted flows, wherein a key to the flow table is a set of match rules.

5. The method of claim 1, wherein each flow is an OpenFlow protocol flow.

6. The method of claim 5, further comprising:
   maintaining a flow path group table of flow path groups converted from routing path groups, wherein a key to the flow path group table is a flow path group identifier, and wherein a value of the flow path group table is a set of actions.

7. The method of claim 1, wherein maintaining a set of routing path groups comprises maintaining a routing path group table, wherein a key to the routing path group table is a routing path group identifier and a value of the routing path group table is a distinct set of paths.

8. The method of claim 1, wherein maintaining a set of routes of a routing protocol comprises maintaining a routing table, wherein a key to the routing table is a destination network address prefix.

9. A computer-implemented method comprising:
   maintaining a set of routing path groups, wherein each routing path group is a distinct set of paths, wherein a path identifies a network address and a device interface identifier, and wherein each routing path group has an associated identifier;

maintaining a set of routes of a routing protocol, wherein each route is identified by a destination address prefix, wherein each route identifies a set of paths, and wherein each route is associated with a routing path group identifier of a routing path group that corresponds to the set of paths;

providing flows to a network device that processes network traffic, each flow having been converted from a respective received route, each flow identifying a respective flow path group derived from a corresponding routing path group from the set of maintained routing path groups;

determining that communication with the network device has been interrupted;

after resuming connection with the network device, receiving from the network device, one or more flow path groups;

converting each maintained routing path group to a corresponding converted flow path group;

determining that one or more particular flow path groups received from the network device each match a respective converted flow path group; and assigning to each maintained routing path group that matches a respective flow path group received from the network device an identifier of the matching flow path group.

10. The method of claim 9, further comprising:

after resuming connection with the network device, designating each maintained routing path group as potentially changed;

removing the designation for each matching routing path group;

determining that a flow path group did not match a converted flow path group using remaining designations after checking each routing path group in the set of routing path groups against the flow path groups received from the network device; and erasing on the network device each flow path group that did not match a converted flow path group.

11. The method of claim 9, further comprising:

after resuming connection with the network device, designating each maintained routing path group as potentially changed including clearing routing path group identifiers of maintained routing path groups;

converting only routing path groups with unassigned identifiers to flow path groups; and writing the converted flow path groups to the network device.

12. The method of claim 11, wherein designating each maintained routing path group as potentially changed includes erasing each routing path group identifier.

13. The method of claim 11, further comprising:

converting routing path groups that are designated as potentially changed to corresponding flow path groups; and writing the corresponding flow path groups to the network device.

14. The method of claim 13, further comprising:

maintaining a flow path group table of flow path groups converted from routing path groups, wherein a key to the flow path group table is a flow path group identifier, and wherein a value of the flow path group table is a set of actions.

15. The method of claim 11, further comprising:

maintaining a flow table of converted flows, wherein a key to the flow table is a set of match rules.

16. The method of claim 9, further comprising:

after resuming connection with the network device, receiving from the network device a set of flows, each flow identifying a destination and having an identifier of a flow path group;

for a particular flow of the received set of flows:

determining that a destination network address of the particular flow matches a destination network address of a particular route in the set of maintained routes, and determining that the flow path group identifier of the particular flow corresponds to a routing path group identifier of the particular route; and designating the particular route as unchanged.

17. The method of claim 16, further comprising:

bypassing a flow update process for the flows that correspond to routes designated as unchanged.

18. The method of claim 16, further comprising:

converting only routes not designated as unchanged to corresponding flows; and writing flows to the network device.

19. The method of claim 9, further comprising:

converting each received route to a flow; and writing each converted flow to a network device.

20. The method of claim 9, wherein each flow is an OpenFlow protocol flow.

21. The method of claim 9, wherein maintaining a set of routing path groups comprises maintaining a routing path group table, wherein a key to the routing path group table is a routing path group identifier and a value of the routing path group table is a distinct set of paths.

22. The method of claim 9, wherein maintaining a set of routes of a routing protocol comprises maintaining a routing table, wherein a key to the routing table is a destination network address prefix.

* * * * *